Aug. 8, 1939.　　　　F. C. HARRIS　　　　2,168,986
OVERHEAD CARRIER
Filed Oct. 11, 1932　　　　3 Sheets-Sheet 1
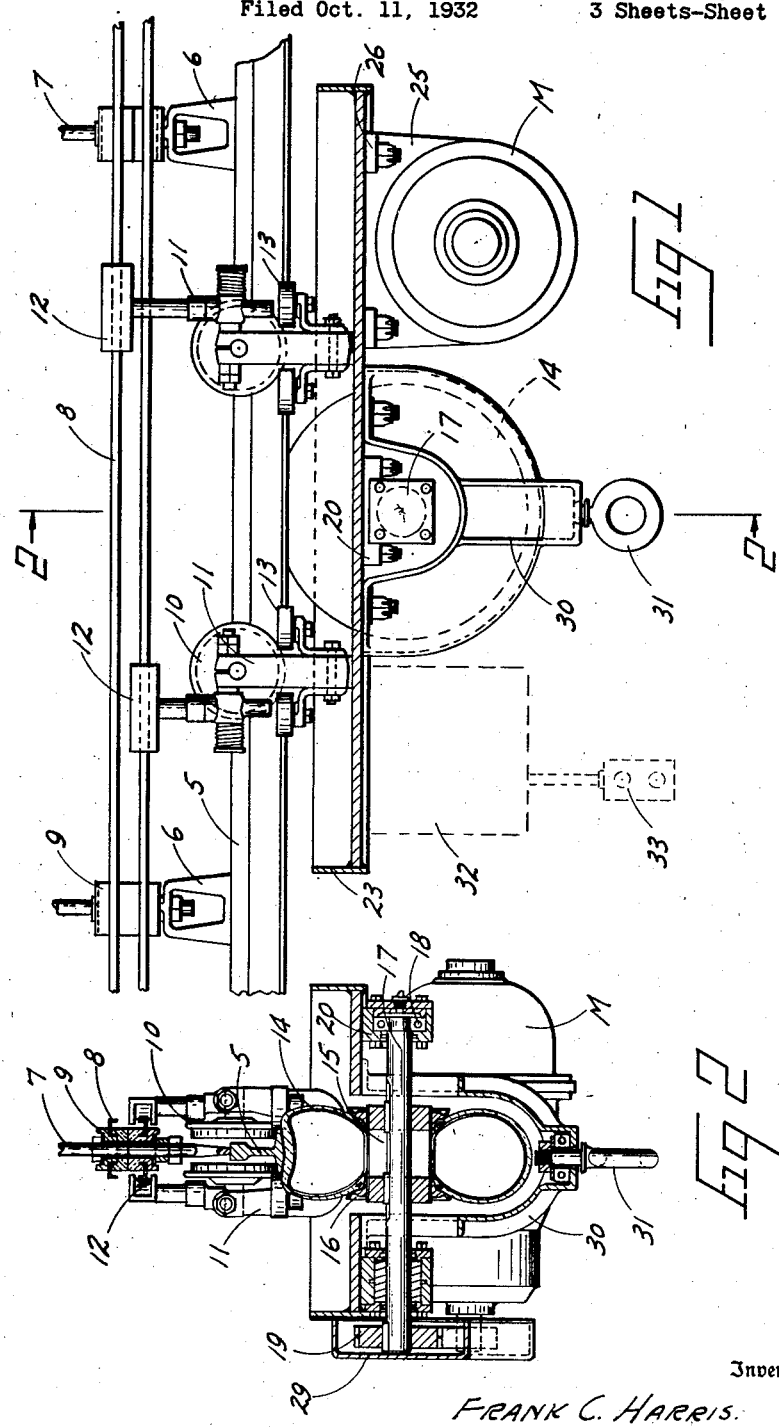
Inventor
FRANK C. HARRIS.
By
Richey & Watts
Attorney Aug. 8, 1939.   F. C. HARRIS   2,168,986
OVERHEAD CARRIER
Filed Oct. 11, 1932   3 Sheets-Sheet 2

Inventor
FRANK C. HARRIS.
By Richey & Watts
Attorney

Aug. 8, 1939.  F. C. HARRIS  2,168,986
OVERHEAD CARRIER
Filed Oct. 11, 1932   3 Sheets-Sheet 3
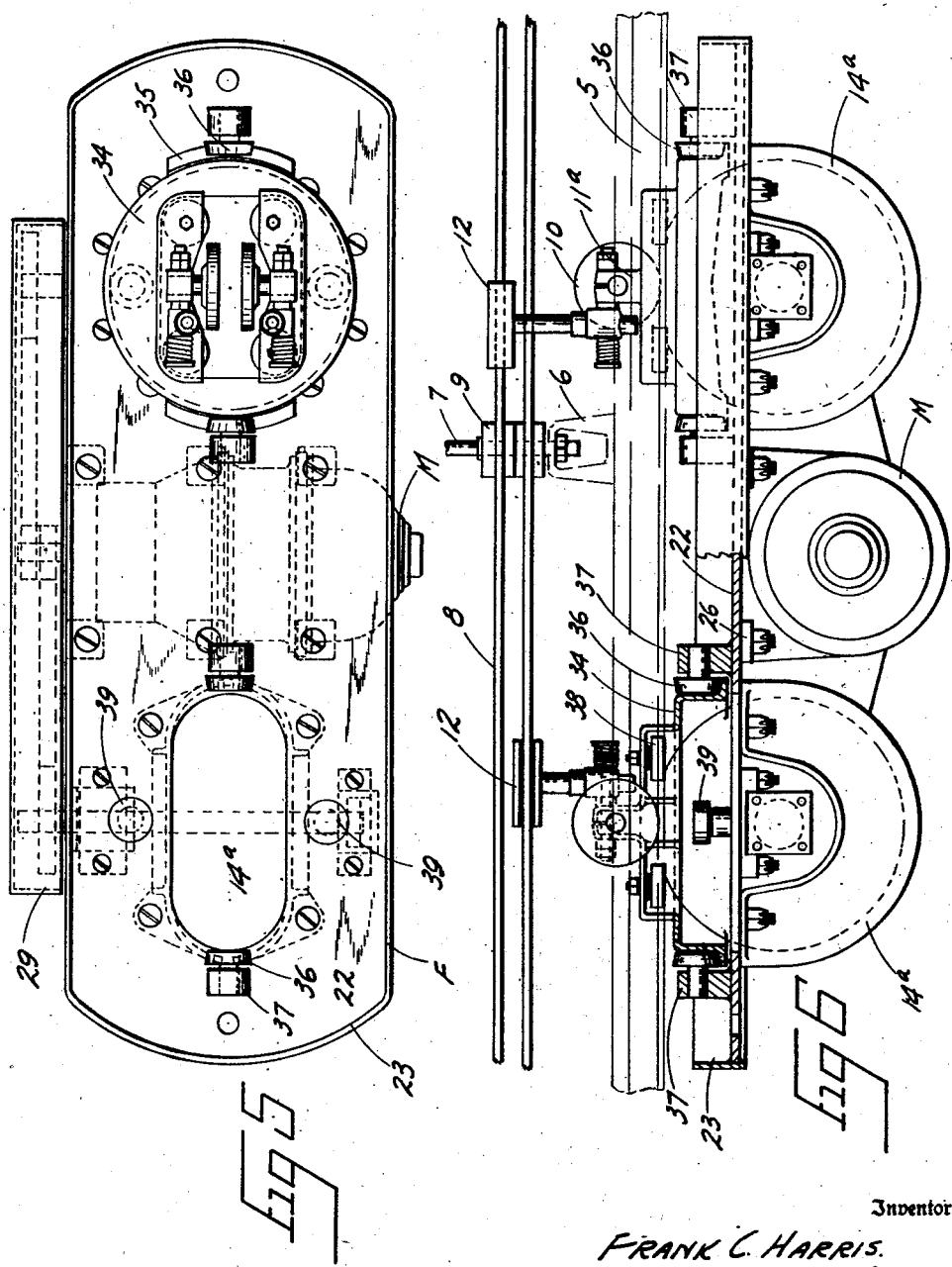
Inventor
FRANK C. HARRIS.
By Richey & Watts
Attorney Patented Aug. 8, 1939

2,168,986

UNITED STATES PATENT OFFICE 2,168,986

OVERHEAD CARRIER

Frank C. Harris, Lakewood, Ohio, assignor to The American Monorail Company, Cleveland, Ohio, a corporation of Ohio Application October 11, 1932, Serial No. 637,264

6 Claims. (Cl. 105—153)

This invention relates to overhead carriers or trolleys of the self-propelled or driven type, and the principal objects of the same are: to provide a traction member or wheel for overhead carriers embodying a high degree of tractive efficiency and one which will adjust itself to the trackway without loss of traction and increase in wear; to provide a carrier of this type wherein the prime mover and drive wheel may be independently, yet cooperatively, mounted on a standed frame; to eliminate separate gear-reduction units and complicated and expensive framing therefor; to render overhead carrier systems more adaptable to varying conditions of installation, such as electric current, motor characteristics, overhead space, etc.; to provide a frame for overhead carriers which is unusually simple in construction and design; to provide a tractor unit composed almost wholly of stock or standard parts; and in general to improve and simplify overhead carrier systems.

The foregoing and other objects and advantages will be rendered apparent in view of the following description taken in conjunction with the drawings, wherein:

Figure 1 is a view in side elevation of an overhead carrier embodying the features of the invention;

Fig. 2 is a sectional view taken on the line 2—2, Fig. 1;

Figs. 5 and 6 are, respectively, views in side elevation and top plan of a modification.

Figure 3:
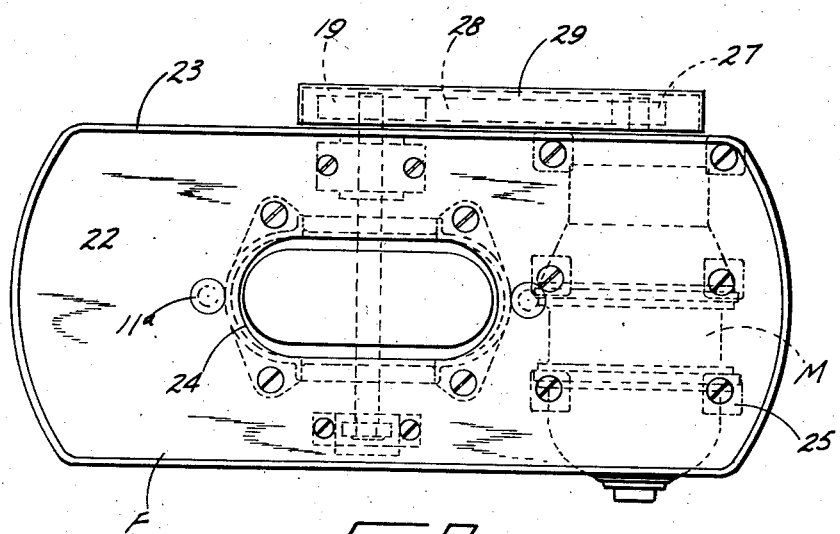
Fig. 3 is a top plan view of the drive assembly including the frame, drive or traction wheel and motor with the trolley removed.

Referring to the drawings in detail, 5 designates the rail for the system which is hung from a suitable support, not shown, by means of hanger brackets 6 and suspension rods or bolts 7. Conductor bars 8 are mounted in insulator brackets 9 carried by the rods or bolts 7. The trolley, which may be of any desired type, includes in its assembly the track wheels 10, wheel yokes or swivel brackets 11, collector shoes 12 and side thrust members 13. Extending down from the collector shoes 12 will be the usual motor connections or leads, not shown, which extend to a suitable control box and to the motor M, to be described.

A feature of the present invention consists in the use of a non-metallic cushioned drive wheel or rail-contacting member therefor preferably in the form of a pneumatic tire 14. This tire may be of any practical width and diameter. The usual standard balloon tire or air wheel or modifications thereof as commonly used on motor vehicles will prove satisfactory. In the construction shown, the tire is mounted on a wheel or hub member 15 provided with side flanges 16. The most effective degree of inflation will be found from experience, although this may vary within reasonable limits. The hub member 15 is splined or otherwise fixed on a shaft 17 which is mounted in bearings 18 and provided with a drive sprocket 19 at one end thereof. The entire drive wheel assembly is supported by brackets 20 which are detachably connected to a frame F, to be described.

Among the advantages of the pneumatic tire drive wheel over the conventional steel or metal type is the increased coefficient of friction between steel and rubber with a resulting increase in traction; the ability of the tire to adjust itself to curves or changes in direction of the rail with a minimum of wear; the reduction in the required number of drive units or pushers, since one drive wheel of the pneumatic type together with a suitably powered motor will prove sufficient for the average installation; the ability to increase traction by using a higher degree of inflation; elimination of wear on the rail, and smooth and silent driving. The tractive force of the pneumatic drive wheel remains constant regardless of whether the carrier is loaded or unloaded, since the drive wheel is located beneath the rail and contacts the face thereof and does not depend on weight for traction, and this also results in a reduction in overhead space required for installation.

The axis of the traction wheel is preferably fixed relative to the frame, to the plane of the axes of the trolley wheels and to the under face of the rail. This axis is preferably spaced below the rail a distance less than the normal radius of the wheel and tire, so that the latter will be flattened or distorted to form an enlarged area of contact with the under side of the rail when the wheel and rail are in assembled position. This area may be substantially equal in width to the greatest width of the tire or to the width of the under surface of the rail.

Figure 4:
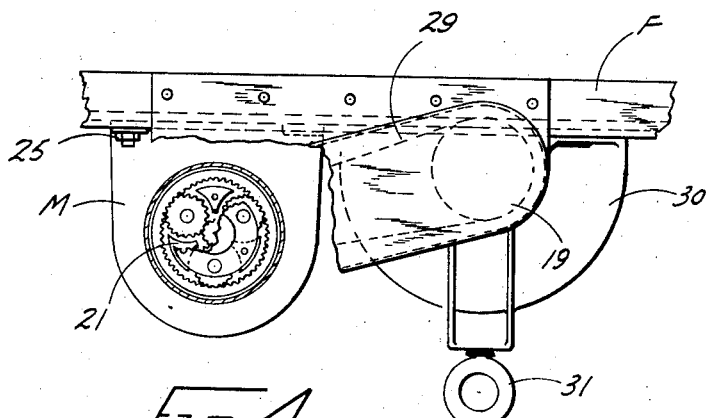
Fig. 4 is a view in elevation of Fig. 3, looking at the side opposite that in Fig. 1, parts being broken away to show the combined motor and speed-reducer unit.

The prime mover M preferably consists of a motor of the gear-head type, as will be noted by referring to Fig. 4, wherein the planetary reduction gears are partly exposed at 21. These gear motors are stocked in varying types and sizes and are available for either direct or alternating current, single or polyphase systems. The necessity of a separate gear-reduction unit or set of gears together with a more or less complicated and expensive housing therefor is entirely dispensed with in the present carrier drive mechanism, due to the use of this type of motor, and the frame structure has been designed to permit the mounting of varying sizes of motors and drive wheels or pneumatic or cushion tires for the latter.

Referring particularly to Fig. 3, it will be noted that the frame F consists of a plate 22 which is swiveled from the yokes 11 by means of swivels 11a rotatable about vertical axes and is preferably formed with a side flange 23. At an intermediate point the plate 22 is formed with an opening 24 to accommodate the traction or drive wheel 15. It will be obvious that the frame could be of open construction. The motor with its built-in gear-reduction unit is provided with mounting brackets 25 which are removably secured as by bolts 26 to the frame plate 22.

The drive from the motor drive pinion 27 to the sprocket wheel 19 may be transmitted through the medium of a silent chain connection 28, the sprockets and chain being enclosed by a housing 29.

The simplicity and ease of manufacture of the frame structure will be obvious. This type of frame permits the use of stock size gear-motors having varying motor characteristics and speed ratios in accordance with each particular installation, and the combination also eliminates the necessity for separate gear-reduction units. Furthermore, the use of expensive jigs and the carrying of a large number of special parts in stock is eliminated.

A wheel guard and load-supporting or suspension bracket 30 provided with an eye-bolt 31 may be attached to the frame plate 22.

The unit may be controlled from a cab or a remote-control system may be used. In case of a cab, the same may be readily suspended from the frame F or an extension thereof. A motor-control or switch-box is shown in dotted lines at 32 together with a push-button switch 33, the leads therefrom being operatively connected with suitable control switches, not shown, but which are well understood in the art and form no part of the present invention. The control box may be located at any point desired, the position shown being adopted for purposes of illustration.

Figs. 5 and 6 show a two-wheel tractor unit with a single motor driving both wheels. The pneumatic tires for the wheels are designated at 14a while the motor, frame and track and trolley units are given the same reference characters as in Figs. 1, 2 and 3, certain parts to be described being excepted. In this type, each traction wheel or tire 14a is held at the center of the rail beneath each trolley wheel 10 at all times instead of cutting across slightly or describing a chord when following curves as in the single wheel unit first described.

The frame in this instance is hung from the trolley by a pan-shaped housing or like member 34 formed with flanges 35 which form a track for rollers 36 journalled in posts or brackets 37 formed as part of, or secured to the frame plate 22. The member 34 is extended upwardly and terminates in wheel yokes 11a. Journalled in the members 34 are rollers 38 which take the side thrust on the rail 5, while additional rollers 39 are journalled in the frame plate 22 and project upwardly and contact the inner wall of the housing or member 34 and prevent lateral displacement of the frame. This construction gives an easy frictionless connection between the trolley and frame, and also permits of a rocking or flexible frame movement.

In Figs. 5 and 6, the frame structure still remains simplified and the motor-reduction unit is used as in the form first described.

It will be noted that the shafts of the traction wheel or wheels and of the motor which drives those wheels are fixed respectively and relatively to each other, that is to say, the axis 17 of the traction wheel of Figs. 1 and 2 is fixed at a given distance from the rail 5 which is a fixed part of the conveyor system. Likewise, the axis of the motor M is fixed with respect to the rail 5 and thus the axes are fixed relative to each other.

It will be understood that the pneumatic tire, for example that shown at 14 in Fig. 2, is flattened or distorted by contact with the rail 5 so that an enlarged area of contact with the under surface of the rail results as compared with the normal area of contact which would be present if the tire engaged the rail without any material deflection. This enlarged area of contact is attained by locating the axis of the wheel carrying the tire 14 at a distance from the rail which is less than the normal radius of the wheel. The brackets 20 serve as means which cooperate with the frame to prevent any decrease in this area of contact when the tire and rail are in engagement with each other. As shown in Fig. 2, the tire has been distorted so as to engage over the full width of the under surface of the rail and so that such engagement is equal in transverse length to a major part of the greatest transverse width of the tire. With the same deflection shown in Fig. 2, an area of contact could be obtained which is approximately as long transversely as the full width of the tire, simply by widening the under surface of the rail. Furthermore, deflection or flattening of the tire not only increases the normal area of contact with the rail, but also results in substantially equal pressure in the plane transversely of the rail, because the air pressure within the tire is equal on all parts thereof.

It will be understood that advantages other than those heretofore specified accrue from the use of the improved carrier and that the description and drawings are not to be construed in the light of limitations, since the scope of the invention is defined by the appended claims.

I claim:

1. In an overhead carrier system, a rail, a trolley, a frame, and means for swivelling said frame to said trolley comprising a pan shaped member provided with flanges, rollers journalled in said frame and adapted to ride on said flanges to retain said frame in association with said member, and thrust rollers mounted in said member and adapted to engage the sides of the rail and to prevent lateral displacement of the frame relative to the rail.

2. In an overhead carrier system, a supporting rail, a traction assembly beneath the rail, trolleys attached to the assembly and having wheels to run on the rail, said assembly including a frame, a pneumatic tired traction wheel and a motor to drive the traction wheel, the said wheel having its axis spaced from the under surface of the rail a distance considerably less than the normal radius of the wheel and tire to provide an enlarged area of substantially uniform pressure contact between the tire and under surface of the rail.

3. A traction device for an overhead carrier system including a frame, trolleys attached to the frame and having supporting wheels to run on and support the frame beneath an overhead rail, a pneumatic tired traction wheel having its axis so positioned relative to the frame that, when the device is assembled with the rail, the tire will be distorted by, and will exert substantially uniform pressure against the under surface of the rail thruout substantially its entire width, and means connecting the frame and the wheel for preventing material change in position of the axis of the traction wheel relative to the rail when the device and rail are in assembled position.

4. A traction device for an overhead carrier system including a frame, trolleys attached to the frame and having supporting wheels to run on and support the frame beneath an overhead rail, a pneumatic tired traction wheel having its axis so positioned relative to the frame that, when the device is assembled with the rail, the tire will be distorted by, and will exert substantially uniform pressure against the under side of the rail over a lateral distance equal to a major part of the lateral width of the tire, and means connecting the frame and wheel for preventing change in position of the axis of the traction wheel relative to the rail when the device and rail are in assembled position.

5. In an overhead carrier system, a rail, a trolley provided with wheels adapted to ride on the side flanges of said rail, a rigid frame swiveled from said trolley, a traction wheel journalled on said frame and provided with a pneumatic tire, the axis of said traction wheel being fixed with respect to the frame and so positioned relative to the frame that, when the device is assembled with the rail, the pneumatic tire will be distorted by, and will exert substantially uniform pressure against the under surface of the rail throughout an elongated area of contact lengthwise of the rail, and a gear head motor carried by the frame and connected to the wheel for driving said wheel and trolley along the rail.

6. In an overhead carrier system, a rail, a trolley adapted for travel on said rail, a frame, and means for pivotally supporting said frame from said trolley, said means comprising a flanged housing provided with rollers adapted to contact said rail, and rollers journalled in said frame and adapted to engage the flanges of said housing.

FRANK C. HARRIS.